US009746184B2

(12) United States Patent
Papple et al.

(10) Patent No.: US 9,746,184 B2
(45) Date of Patent: *Aug. 29, 2017

(54) COMBUSTOR DOME HEAT SHIELD (71) Applicant: Pratt & Whitney Canada Corp., Longueuil (CA)

(72) Inventors: Michael Papple, Verdun (CA); Robert Sze, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 329 days.

This patent is subject to a terminal disclaimer.

(21) Appl. No.: 14/684,891

(22) Filed: Apr. 13, 2015

(65) Prior Publication Data

US 2016/0298846 A1    Oct. 13, 2016

(51) Int. Cl.
*F23R 3/10* (2006.01)
*F23R 3/26* (2006.01)

(52) U.S. Cl.
CPC ...... *F23R 3/10* (2013.01); *F23R 3/26* (2013.01); *F23R 2900/03041* (2013.01); *F23R 2900/03044* (2013.01)

(58) Field of Classification Search
CPC ..... F23R 3/10; F23R 3/26; F23R 2900/03041
See application file for complete search history.

(56) References Cited

U.S. PATENT DOCUMENTS

| | | | |
|---|---|---|---|
| 4,934,145 A * | 6/1990 | Zeisser | F23R 3/283 60/740 |
| 5,271,219 A | 12/1993 | Richardson | |
| 5,894,732 A * | 4/1999 | Kwan | F23R 3/283 60/748 |
| 5,956,955 A * | 9/1999 | Schmid | F23R 3/10 60/748 |
| 6,751,961 B2 | 6/2004 | Pacheco-Tougas et al. | |
| 6,955,053 B1 | 10/2005 | Chen et al. | |
| 6,978,618 B2 | 12/2005 | Pacheco-Tougas et al. | |

(Continued)

FOREIGN PATENT DOCUMENTS

WO    WO2014/130978    8/2014

OTHER PUBLICATIONS

U.S. Appl. No. 14/305,404, filed Jun. 16, 2014.

*Primary Examiner* — Pascal M Bui Pho
*Assistant Examiner* — Eric Linderman
(74) *Attorney, Agent, or Firm* — Norton Rose Fulbright Canada LLP (57) ABSTRACT

A combustor heat shield comprises a heat shield body adapted to be mounted to a combustor wall with a back side of the heat shield body in spaced-apart facing relationship with the combustor wall to define an air gap between the heat shield body and the combustor wall. At least one nozzle opening is defined in the heat shield bod. The opening is bordered by a nozzle opening boss. The boss extends from the back side of the heat shield body across the air gap for sealing engagement with an adjacent part of the combustor. An annular array of effusion holes is provided adjacent the nozzle opening boss. The effusion holes extend through the heat shield body for passing cooling air from the back side to a front side of the heat shield body. Fins are interspersed between the effusion holes on the back side of the heat shield.

19 Claims, 7 Drawing Sheets

(56) References Cited

U.S. PATENT DOCUMENTS

| | | | |
|---|---|---|---|
| 7,506,512 B2* | 3/2009 | Schumacher | F23R 3/12 60/754 |
| 7,681,398 B2 | 3/2010 | Patel et al. | |
| 7,721,548 B2 | 5/2010 | Patel et al. | |
| 7,748,221 B2 | 7/2010 | Patel et al. | |
| 8,316,541 B2 | 11/2012 | Patel et al. | |
| 2003/0213249 A1* | 11/2003 | Pacheco-Tougas | F23R 3/002 60/752 |
| 2007/0044935 A1* | 3/2007 | Memmen | B22C 7/02 164/45 |
| 2007/0130953 A1* | 6/2007 | Burd | F23R 3/06 60/772 |
| 2008/0104962 A1* | 5/2008 | Patel | F23R 3/10 60/752 |
| 2008/0115498 A1* | 5/2008 | Patel | F23R 3/10 60/752 |
| 2008/0115499 A1* | 5/2008 | Patel | F23R 3/10 60/752 |
| 2008/0115506 A1* | 5/2008 | Patel | F02C 3/145 60/804 |
| 2009/0000303 A1* | 1/2009 | Patel | F23R 3/002 60/752 |
| 2011/0126543 A1* | 6/2011 | Kirsopp | F23R 3/002 60/742 |
| 2013/0055722 A1* | 3/2013 | Verhiel | F23R 3/007 60/772 |
| 2014/0090402 A1* | 4/2014 | Erbas-Sen | F23R 3/04 60/806 |
| 2015/0345789 A1* | 12/2015 | Papple | F23R 3/10 60/772 |
| 2015/0362191 A1* | 12/2015 | Papple | F23R 3/04 60/772 |
| 2016/0298841 A1* | 10/2016 | Papple | F23R 3/005 |

* cited by examiner

COMBUSTOR DOME HEAT SHIELD

TECHNICAL FIELD

The application relates generally to gas turbine engines and, more particularly, to combustor dome heat shields.

BACKGROUND OF THE ART

Heat shields such as those used to protect the combustor shells, are exposed to hot gases in the primary combustion zone. The amount of coolant available for cooling the heat shields must be minimized to improve the combustion efficiency and to reduce smoke, unburned hydrocarbon and CO/NOx emission.

There is a continuing need for improved heat shields and targeted cooling schemes.

SUMMARY

In one aspect, there is provided a heat shield for a combustor of a gas turbine engine, comprising a heat shield body adapted to be mounted to a combustor shell with a back face of the heat shield body in spaced-apart facing relationship with the combustor shell to define an air gap between the heat shield body and the combustor shell, at least one nozzle opening defined in the heat shield body; a nozzle opening boss bordering the at least one fuel nozzle opening and configured for extending from the back face of the heat shield body across the air gap for sealing engagement with an adjacent combustor part, an annular array of effusion holes adjacent the nozzle opening boss, the effusion holes extending through the heat shield body and configured to pass cooling air from the back face to a front face of the heat shield body, and fins interspersed between the effusion holes on the back side of the heat shield.

In a second aspect, there is provided a combustor for a gas turbine engine, comprising: a combustor shell defining a combustion chamber, a heat shield mounted to the combustor shell with a back face of the heat shield in spaced-apart facing relationship with the combustor shell to define an air gap between the heat shield and the combustor shell, at least one nozzle opening defined in the heat shield; a nozzle opening boss bordering the at least one fuel nozzle opening and extending from the back face of the heat shield across the air gap into sealing engagement with an adjacent combustor part, an annular array of effusion holes around the nozzle opening boss, the effusion holes extending through the heat shield and configured to pass cooling air from the back face to a front face of the heat shield, and fins interspersed between the effusion holes on the back face of the heat shield.

In a third aspect, there is provided a method of cooling a combustor heat shield mounted in a combustor of a gas turbine engine, the method comprising: recuperating impingent air directed over an impingement cooled region of the heat shield and causing it to flow over a non-impingement cooled region surrounded by the impingement cooled region, increasing heat transfer in the non-impingement cooled region by causing the air to flow over fins disposed in the non-impingement cooled region, and effusion cooling the non-impingement cooled region of the heat shield by passing the air through effusion holes defined in the non-impingement cooled region.

DESCRIPTION OF THE DRAWINGS

Reference is now made to the accompanying figures, in which:

FIG. 3 is an enlarged isometric view of the dome portion of the combustor illustrating mounting details of the combustor dome heat shields against the inner surface of the combustor shell;

DETAILED DESCRIPTION

Figure 1:
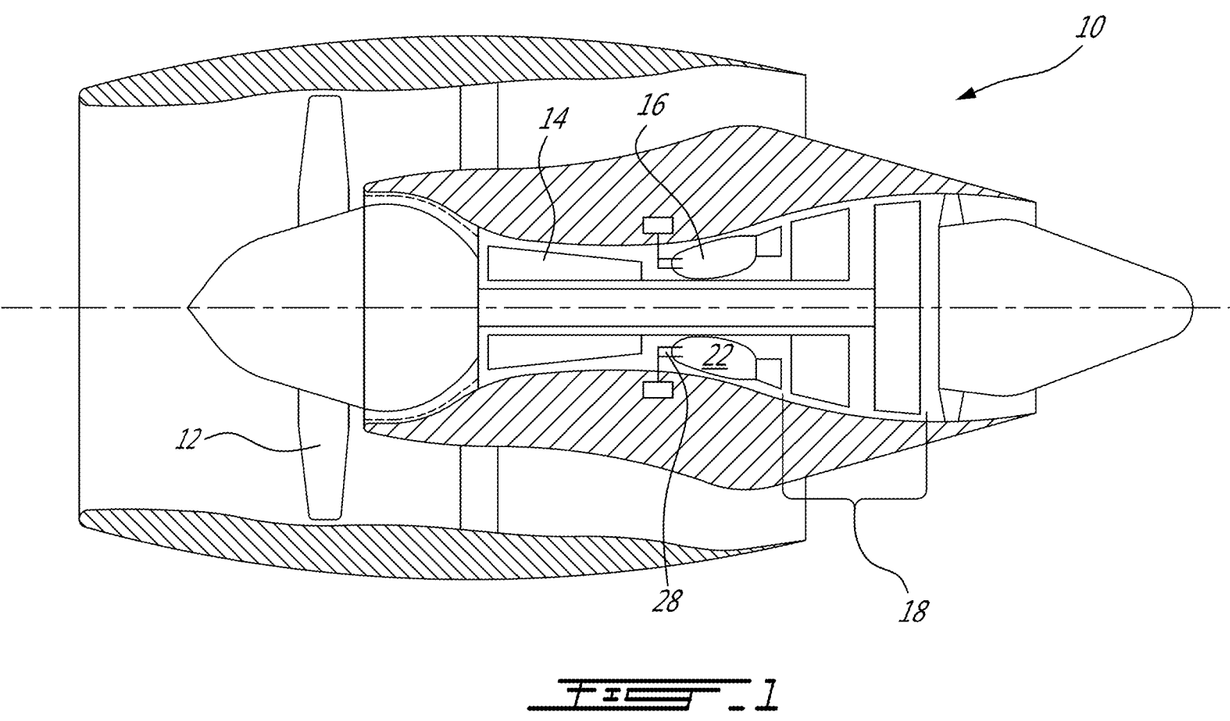
FIG. 1 is a schematic cross-section view of a turbofan engine having a straight flow combustor.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
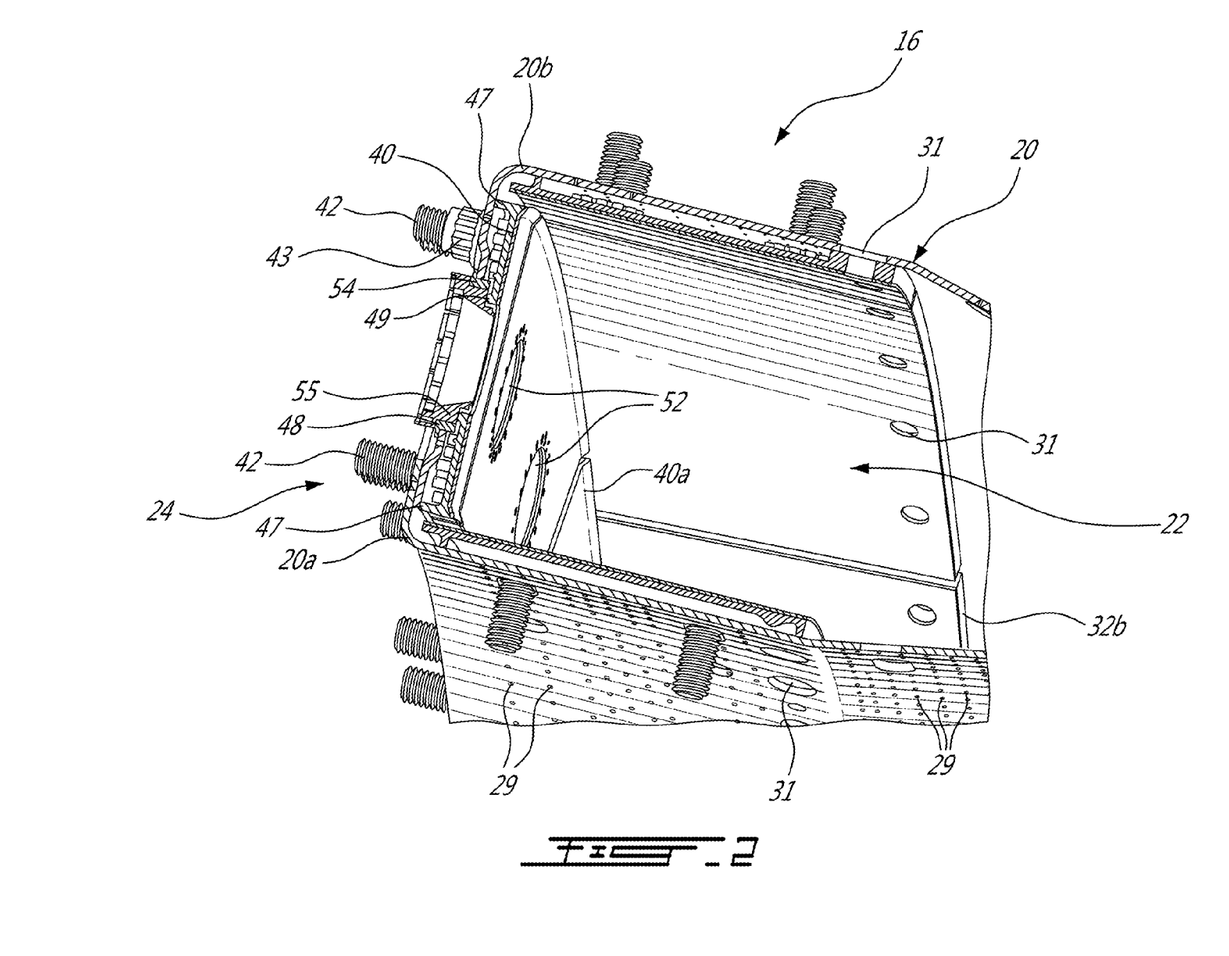
FIG. 2 is an isometric view of a dome portion of the combustor of the engine shown in FIG. 1.

The combustor 16 is housed in a plenum supplied with compressed air from compressor 14. As shown in FIG. 2, the combustor 16 may comprise an annular combustor shell 20 including a radially inner shell 20a and a radially outer shell 20b, defining a combustion chamber 22. The combustor 16 has a bulkhead or inlet dome portion 24. The combustor 16 further has at a downstream end thereof an exit portion (not shown) for communicating combustion gases with the turbine section 18. As shown in FIG. 1, a plurality of fuel nozzles 28 are mounted to extend through the dome portion 24 of the combustor 20 to deliver a fuel-air mixture to the combustion chamber 22.

It is understood that the inner and outer shells 20a and 20b may have any suitable configuration. The inner and outer shells 20a and 20b are typically made out of sheet metal, though any suitable material(s) and manufacturing method(s) may be used.

Referring to FIG. 2, it can be appreciated that circumferentially distributed dome heat shields 40 are mounted to the dome portion 24 of the inner and outer shells 20a, 20b inside the combustion chamber 22 to protect the dome portion 24 from the high temperatures in the combustion chamber 22. The dome heat shields 40 are typically castings made out of high temperature capable materials. Each dome heat shield 40 has a heat shield body 40a typically provided in the form of a circular sector (see FIGS. 5 and 6). A plurality of threaded studs 42 (six according to the example shown in FIGS. 5 and 6) extends from a back face 44 of the heat shield body 40a and through corresponding mounting holes (not shown) defined in the combustor dome. Self-locking nuts 43 are threadably engaged on the studs 42 from outside of the combustion chamber 22 for holding the dome heat shields 40 tightly against the combustor dome.

As shown in FIG. 2, circumferentially spaced-apart fuel nozzle openings 48 are defined through the combustor dome portion 24 for allowing mounting of the fuel nozzles 28 to the combustor 16. At least one corresponding fuel nozzle opening 52 (two in the example illustrated in FIGS. 2, 5 and 6) is defined in each of the dome heat shield bodies 40a and is aligned with a corresponding one of the fuel nozzle openings 48 in the combustor dome portion 24 for accommodating an associated fuel nozzle 28 therein. The provision of two or more fuel nozzle openings 52 in each heat shield body 40a reduces the number of heat shields required to cover the dome portion 24, the number of studs 42, rail, air coolant leakage, cost and weight when compared to dome heat shields for a single fuel nozzle.

As illustrated in FIGS. 2 and 3, a brazed nut 54 is inserted into each opening 48 and brazed in place. A swirler 55 is mounted concentrically to the opening in each brazed nut 54 and extends into the corresponding opening 52 in the dome heat shield body 40a. The swirler 55 is adapted to accommodate an associated one of the fuel nozzle 28 for injecting fuel into the combustion chamber 22.

Figure 5:
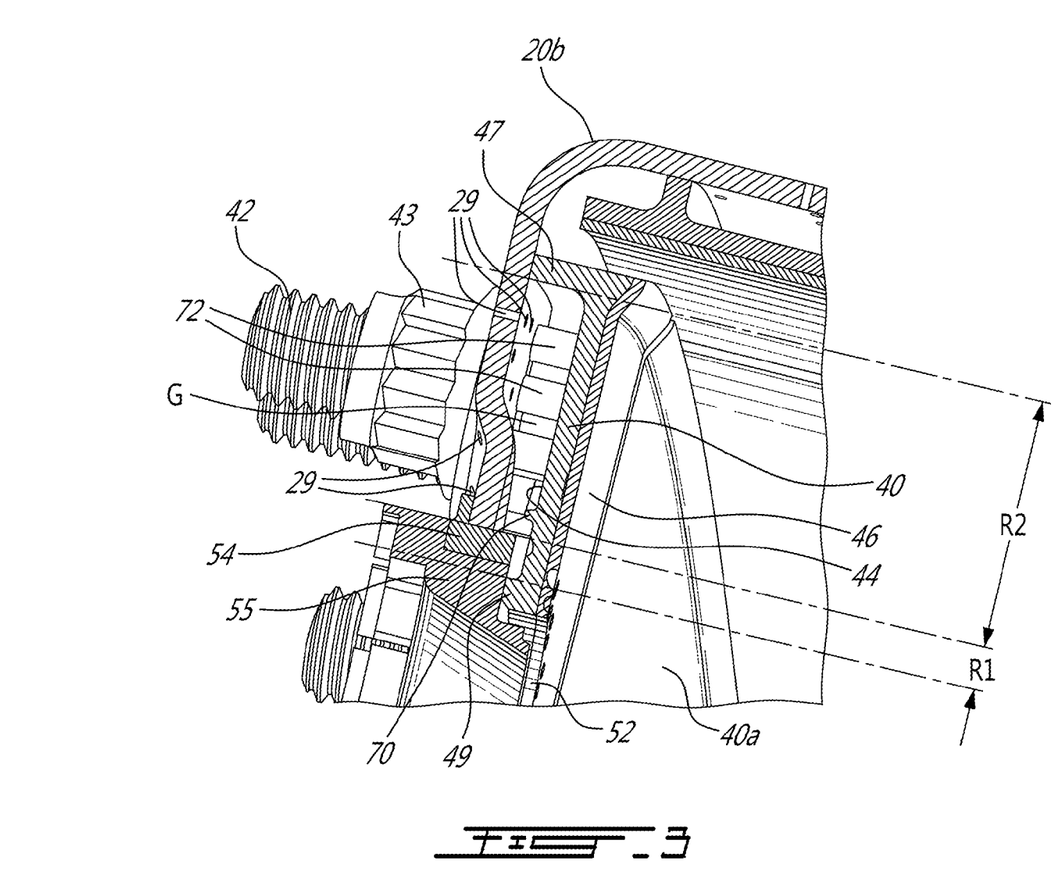
FIG. 5 is a simplified rear isometric view of the back side of a segment of the combustor dome heat shield illustrating effusion holes and fins around the fuel nozzle openings, heat transfer promoting structures, such as pins on the back face of the heat shield being omitted for clarity.
Figure 6:
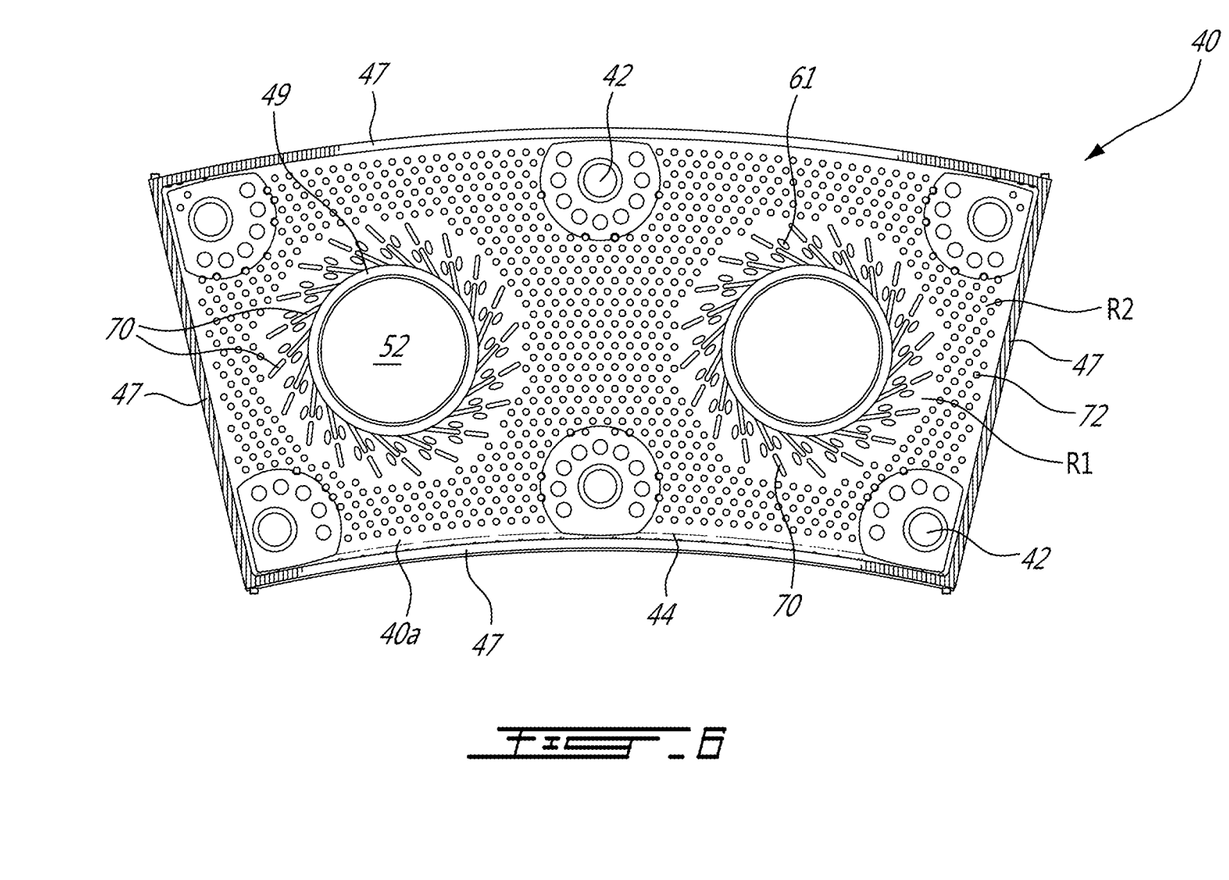
FIG. 6 is a rear plan view of a segment of the combustor dome heat shield and illustrating the arrangement of effusion holes, fins and pins on the back face of the heat shield segment.
Figure 7:
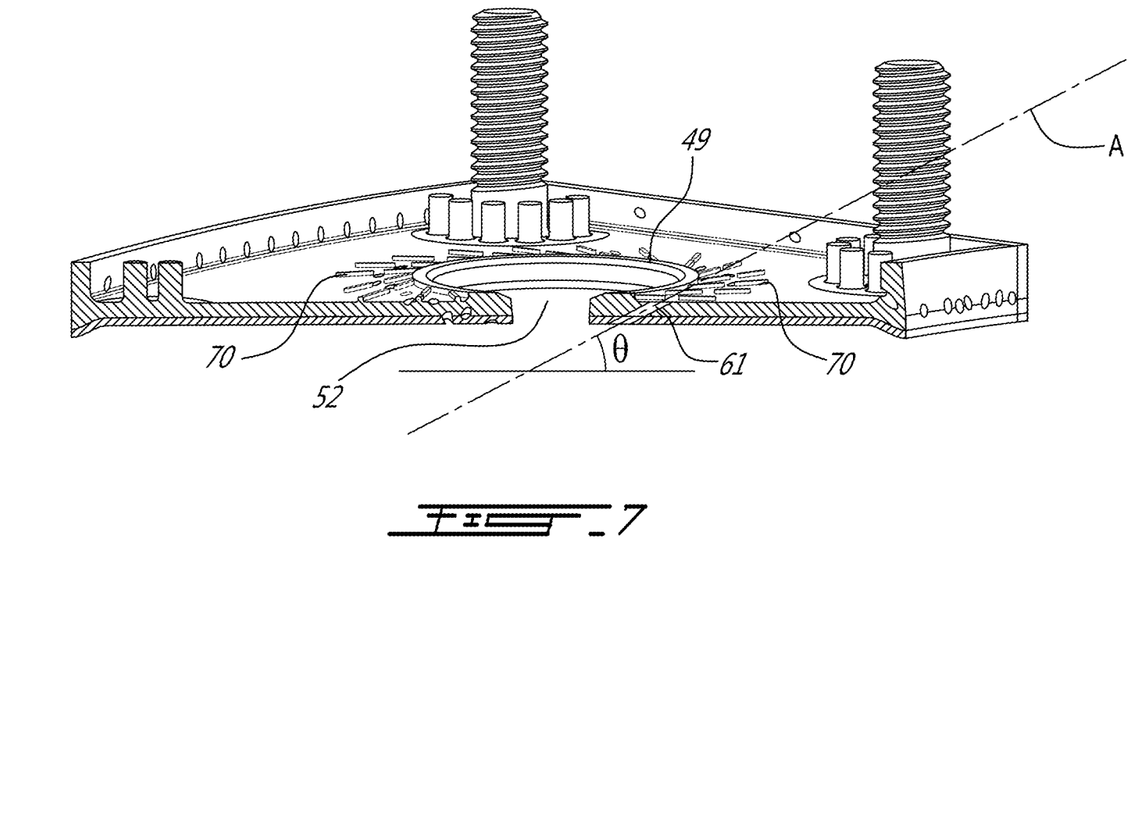
FIG. 7 is a partial view of the combustor dome heat shield illustrating the angular orientation of the effusion holes relative to the heat shield body.

As shown in FIG. 3, the back face 44 of each heat shield body 40a is the cool side of the heat shield 40, facing the dome portion 24, while the opposed front face 46 is the hot side, facing the combustion chamber 22. The heat shield body 40a is spaced from the dome portion 24 so that the back face 44 defines a cooling air space or gap C. As can be appreciated from FIGS. 2, 3, 5 and 6, rails extend from the back face 44 of each heat shield body 40a across the cooling air gap and into sealing engagement with the combustor shell 20, thereby compartmentalizing the cooling air gap and directing the cooling air as suited towards targeted areas. As best shown in FIGS. 5 and 6, the rails may comprises periphery rails 47 along the perimeter of each heat shield body 40a. Also referring concurrently to FIGS. 2, 3, 5 and 6, it can be seen that each nozzle opening 52 is circumscribed on the back face 44 of the nozzle body 40a by a nozzle opening boss 49, which extends across the cooling air gap into sealing engagement with the swirler 55.

Figure 4:
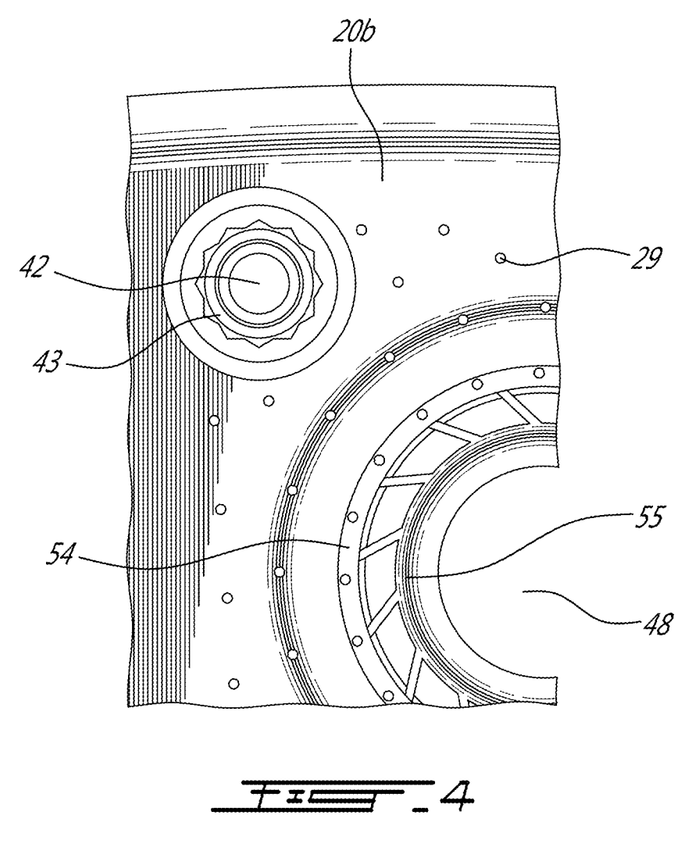
FIG. 4 is an enlarged rear plan view illustrating an impingement hole pattern in the dome portion of the combustor shell for directing impingement jets over selected regions of the dome heat shields.

Relatively cool air from the plenum surrounding the combustor is admitted in the compartmentalized cooling air gap G. As best shown in FIGS. 2 and 4, a plurality of impingement holes 29 may be defined in the inner and outer shells 20a and 20b for directing impingement jets against the back face 44 of the heat shield bodies 40a. Dilution holes 31 may also be provided in the combustor shell for combustion purposes.

More particularly, as shown in FIG. 4, impingement hole patterns are arranged in the dome portion 24 of the combustor shell 20 to optimize dome heat shield cooling. For instance, the impingement holes 29 may be laser drilled through the outer shell 20b and the flange of the brazed nut 54 to allow coolant to impinge on the majority of the back face of the dome heat shield bodies 40a. However, it is not possible to laser impingement holes through the swirler 55, and as a result there is an annular region R (see FIGS. 3, 5 and 6) on the dome heat shield bodies 40a around each nozzle opening boss 49 which cannot be impingement cooled. The non-impingement cooled region R1 corresponds to the annular region over which the swirler 55 extends. Indeed, the swirler 55 blocks impingement jet access to the surface of the heat shield which is disposed directly thereunder.

As can be appreciated from FIGS. 3, 5 and 6, the non-impingement cooled region RI is not bounded at its outer periphery by any sealing rail or flow barrier. Accordingly, the cooling air which is used to impingement-cool the region R2 extending between region R1 and the closed perimeter defined by the periphery rails 47 is free to flow from region R2 to the non-impingement cooled region R1 after impinging upon the back face 44 of the heat shield body 40a. That is the impingement cooled region R2 and the non-impingement cooled regions R1 are in open fluid flow communication. Sealing is provided by the nozzle opening bosses 49 at the inner diameter of the non-impingement cooled region R1. In this way, the impingement air in region R2 can be re-used to cool down region R1. Such dual use of the cooling air advantageously contributes to minimize the amount of cooling air required for the heat shields 40.

As best shown in FIGS. 5 and 6, effusion holes 61 are provided in regions RI around the nozzle opening bosses 49, thereby allowing for effusion cooling of each region R1. More particularly, an annular array which may include one or more circular rows of effusion holes 61 may be provided at the base of each nozzle opening boss 49 concentrically about each fuel nozzle opening 52 for allowing air flowing from the surrounding impingement-cooled region R2 to flow through the dome heat shield body 40a to provide for the formation of a cooling film over the front face 46 of the dome heat shield body 40a. The effusion holes of the inner row can be circumferentially staggered relative to effusion holes of the outer row. The effusion holes 61 of both rows may be arranged with a tangential component relative to the nozzle opening 52, so that the angle $\theta$ of the axis A of the holes 61, to the hot or front face 46 of the heat shield, can be shallow; e.g. 15° to 45° to the plane of the heat shield. The holes 61 are oriented so that after leaving the holes the coolant air 'swirls' around the fuel nozzle openings 52.

Cooling of the regions R1 is improved by adding elongated fins 70 around the nozzle opening bosses 49. The term "fin" is herein understood as referring to an elongated surface that extends from an object to increase the rate of heat transfer to or from the environment by increasing convection. For instance, the fins could take the form of trip strips. The fins 70 allow to locally improve heat transfer by increasing the surface area of the regions R1. The fins 70 are located in the regions R1 and are arranged tangentially between and generally in the same direction as the effusion holes 61. One or more annular rows of fins 70 (two in the illustrated example) may be disposed concentrically at the base of the nozzle opening bosses 49. The fins 70 of the inner row may be circumferentially staggered or generally aligned relative to the fins 70 of the outer row. The fins 70 are interspersed between the effusion holes 61. In the illustrated embodiment, each fin 70 of the inner row of fins is disposed between two adjacent effusion holes 61 of the inner row of effusion holes. Likewise, each fin 70 of the outer row of fins is disposed between two adjacent effusion holes 61 of the outer row of effusion holes. The longitudinal axis of the fins 70 is generally parallel to the axis of the effusion holes 61 in the plane of the heat shield body 40a. The alignment of the fins 70 with the effusion holes 61 ensures that when the effusion holes 61 are laser drilled, the laser does not strike the fins 70. As can be appreciated from FIG. 3, the height of the fins 70 is less than the height of the periphery rails 47 and the nozzle opening bosses 49. That is the tins 70 only partly extend across the cooling air gap (i.e. they are spaced from the combustor shell and, thus, they do not seal). From FIG. 6, it can also be appreciated that the fins 70 of the inner row of fins extend from the nozzle opening boss 49, thereby promoting heat transfer up to the mouth of the fuel nozzle opening 52.

As can be appreciated from FIGS. 3 and 6, other heat transfer augmentation features, such as pins 72, can be distributed over the back face 44 of the heat shield body 40a in the impingement-cooled region R2 to promote turbulence of the cooling air within region R2 and to add greater heat transfer area in this region.

In operation, coolant air from the plenum passes through the impingement holes 29 in the outer shell 20b and the nut 44 and impinges upon the back face 44 of the dome heat shields in region R2. A portion of the impingement air flows radially inwardly to adjacent regions R1 where the air flows over the fins 70 and through the effusion holes 61 near each fuel nozzle opening 52, thereby convection cooling region R1. The air flowing through the effusion holes 61 provides for the formation of a film of coolant air over the front face 46 of the heat shields 40.

The above description is meant to be exemplary only, and one skilled in the art will recognize that changes may be made to the embodiments described without departing from the scope of the invention disclosed. For example, the invention can be provided in any suitable heat shield configuration and in any suitable combustor configuration, and is not limited to application in turbofan engines. Also, it is understood that the nozzle opening boss 49 could seal against various adjacent combustor part not only with a swirler. Still other modifications which fall within the scope of the present invention will be apparent to those skilled in the art, in light of a review of this disclosure, and such modifications are intended to fall within the appended claims.

What is claim is:

1. A heat shield for a combustor of a gas turbine engine, comprising a heat shield body adapted to be mounted to a combustor shell with a back face of the heat shield body in spaced-apart facing relationship with the combustor shell to define an air gap between the heat shield body and the combustor shell, at least one nozzle opening defined in the heat shield body, a nozzle opening boss bordering the at least one fuel nozzle opening and configured for extending from the back face of the heat shield body across the air gap for sealing engagement with an adjacent combustor part, an annular array of effusion holes adjacent the nozzle opening boss, the effusion holes extending through the heat shield body and configured to pass cooling air from the back face to a front face of the heat shield body, and fins interspersed between the effusion holes on the back side of the heat shield, wherein said effusion holes and said fins are located in a non-impingement cooled region of the heat shield, wherein the annular array of effusion holes comprises an inner and an outer annular row of effusion holes, and wherein the fins comprise an inner and outer annular row of fins, the fins of the inner annular row of fins extending in between pairs of adjacent effusion holes of the inner annular row of effusion holes, the fins of the outer annular row of fins extending in between pairs adjacent effusion holes of the outer annular row of effusion holes.

2. The heat shield defined in claim 1, wherein the effusion holes are aligned tangentially to the at least one fuel nozzle opening.

3. The heat shield defined in claim 1, wherein an axis of each effusion hole extends at a shallow angle of between 15° and 45° to the plane of the heat shield body.

4. The heat shield defined in claim 2, wherein each fin is generally aligned tangentially to the fuel nozzle opening and generally parallel to an axis of the adjacent effusion holes.

5. The heat shield defined in claim 1, wherein the fins are aligned parallel to the adjacent effusion holes.

6. The heat shield defined in claim 1, wherein the fins have a height which is less than that of the nozzle opening boss.

7. The heat shield defined in claim 1, wherein the fins of the inner annular row have an inner end which extends from the nozzle opening boss.

8. The heat shield defined in claim 1, wherein said non-impingement cooled region is surrounded by an impingement cooled region, and wherein said impingement cooled region is in fluid flow communication with said non-impingement cooled region, and wherein heat transfer augmentation features are provided in the impingement cooled region.

9. A combustor for a gas turbine engine, comprising: a combustor shell defining a combustion chamber, a heat shield mounted to the combustor shell with a back face of the heat shield in spaced-apart facing relationship with the combustor shell to define an air gap between the heat shield and the combustor shell, at least one nozzle opening defined in the heat shield; a nozzle opening boss bordering the at least one fuel nozzle opening and extending from the back face of the heat shield across the air gap into sealing engagement with an adjacent combustor part, an annular array of effusion holes around the nozzle opening boss, the effusion holes extending through the heat shield and configured to pass cooling air from the back face to a front face of the heat shield, and fins interspersed between the effusion holes on the back face of the heat shield wherein said effusion holes and said fins are located in a non-impingement cooled region of the heat shield, wherein the annular array of effusion holes comprises an inner and an outer annular row of effusion holes, and wherein the fins comprise an inner and outer annular row of fins, the fins of the inner annular row of fins extending in between pairs of adjacent effusion holes of the inner annular row of effusion holes, the fins of the outer annular row of fins extending in between pairs adjacent effusion holes of the outer annular row of effusion holes.

10. The combustor defined in claim 9, wherein the adjacent combustor part has a peripheral portion which extends over the non-impingement cooled region of the heat shield around the nozzle opening boss, said peripheral portion blocking impingement jet access to said non-impingement cooled region of the heat shield.

11. The combustor defined in claim 10, wherein said adjacent part of the combustor is a swirler.

12. The combustor defined in claim 9, wherein impingement holes are defined in the combustor shell to direct impingement jets over a second region of the back side of the heat shield, said second region surrounding said non-impingement cooled region and being in fluid flow communication therewith.

13. The combustor defined in claim 9, wherein the effusion holes each has an axis aligned tangentially to the at least one fuel nozzle opening.

14. The combustor defined in claim 9, wherein the axis of each effusion hole extends at a shallow angle of between 15° and 45° to the plane of the heat shield.

15. The combustor defined in claim 9, wherein each fin is generally aligned tangentially to the fuel nozzle opening and generally parallel to an axis of the adjacent effusion holes.

16. The combustor defined in claim 9, wherein the fins are aligned parallel to the adjacent effusion holes.

17. The combustor defined in claim 9, wherein the fins have a height which is less than that of the nozzle opening boss.

18. The combustor defined in claim 9, wherein the fins of the inner annular row have an inner end which extends from the nozzle opening boss.

19. A method of cooling a combustor heat shield mounted in a combustor of a gas turbine engine, the method comprising: recuperating impingent air directed over an impingement cooled region of the heat shield and causing it to flow over a non-impingement cooled region surrounded by the impingement cooled region, increasing heat transfer in the non-impingement cooled region by causing the air to flow over fins disposed in the non-impingement cooled region, and effusion cooling the non-impingement cooled region of the heat shield by passing the air through effusion holes defined in the non-impingement cooled region, wherein the annular array of effusion holes comprises an inner and an outer annular row of effusion holes, and wherein the fins comprise an inner and outer annular row of fins, the fins of the inner annular row of fins extending in between pairs of adjacent effusion holes of the inner annular row of effusion holes, the fins of the outer annular row of fins extending in between pairs adjacent effusion holes of the outer annular row of effusion holes.

\* \* \* \* \*